US008836462B2

(12) United States Patent
Curiac (10) Patent No.: US 8,836,462 B2
(45) Date of Patent: Sep. 16, 2014

(54) MODULAR RECONFIGURABLE POLYPHASE POWER TRANSFORMER

(75) Inventor: Radu Stefan Curiac, Erlanger, KY (US)

(73) Assignee: Siemens Industry, Inc., Alpharetta, GA (US)

(*) Notice: Subject to any disclaimer, the term of this patent is extended or adjusted under 35 U.S.C. 154(b) by 639 days.

(21) Appl. No.: 13/053,666

(22) Filed: Mar. 22, 2011

(65) Prior Publication Data

US 2012/0242261 A1    Sep. 27, 2012

(51) Int. Cl.
| | |
|---|---|
| H01F 17/04 | (2006.01) |
| H01F 30/12 | (2006.01) |
| H01F 27/02 | (2006.01) |
| H01F 27/28 | (2006.01) |
| H02P 25/18 | (2006.01) |
| H02P 13/00 | (2006.01) |
| H01F 30/14 | (2006.01) |

(52) U.S. Cl.
CPC ............... H01F 30/14 (2013.01); H02P 25/18 (2013.01); H02P 13/00 (2013.01)
USPC .................. 336/221; 336/5; 336/83; 336/170

(58) Field of Classification Search
USPC ................... 336/221, 5, 170, 83, 222
See application file for complete search history.

(56) References Cited

U.S. PATENT DOCUMENTS

| | | | | |
|---|---|---|---|---|
| 3,629,518 A | * | 12/1971 | Costa | 360/115 |
| 4,351,102 A | * | 9/1982 | Grozinger et al. | 29/596 |
| 5,317,299 A | * | 5/1994 | Dhyanchand et al. | 336/5 |
| 5,955,808 A | * | 9/1999 | Hill | 310/180 |
| 6,335,872 B1 | | 1/2002 | Guskov | |
| 6,965,183 B2 | * | 11/2005 | Dooley | 310/201 |
| 2003/0085627 A1 | * | 5/2003 | Lipo et al. | 310/12 |
| 2006/0227582 A1 | * | 10/2006 | Wei et al. | 363/126 |
| 2009/0058584 A1 | * | 3/2009 | Rastogi et al. | 336/5 |
| 2010/0176755 A1 | * | 7/2010 | Hoadley et al. | 318/105 |

FOREIGN PATENT DOCUMENTS

WO   2011094743 A1   8/2011

OTHER PUBLICATIONS

PCT International Search Report mailed Sep. 14, 2012 corresponding to PCT International Patent Application No. PCT/US2012/027837 filed Mar. 6, 2012.

* cited by examiner

*Primary Examiner* — Alexander Talpalatski
*Assistant Examiner* — Kazi Hossain (57) ABSTRACT

An AC transformer having a cylindrical core configurable for single or polyphase power input and/or output transformer applications. The transformer core structure is capable of being configured to provide for single or polyphase inputs or outputs by varying the transformer primary and secondary winding configurations. A polyphase input configuration can be utilized in polyphase output transformers, such as for variable frequency drive (VFD) applications. Additional methods for winding transformer cores minimize the quantity of core winding wire necessary for transformer manufacture.

15 Claims, 12 Drawing Sheets

MODULAR RECONFIGURABLE POLYPHASE POWER TRANSFORMER

BACKGROUND OF THE DISCLOSURE

1. Field of the Invention

The present invention relates to alternating current (AC) power transformers and more particularly to multi-phase AC power transformers for converting one or more input power phases to multi-phase output by selectively configuring windings on a common transformer core structure. Transformers of the present invention are suitable for powering an AC motor variable frequency drive (VFD).

2. Description of the Prior Art

Figure 1:
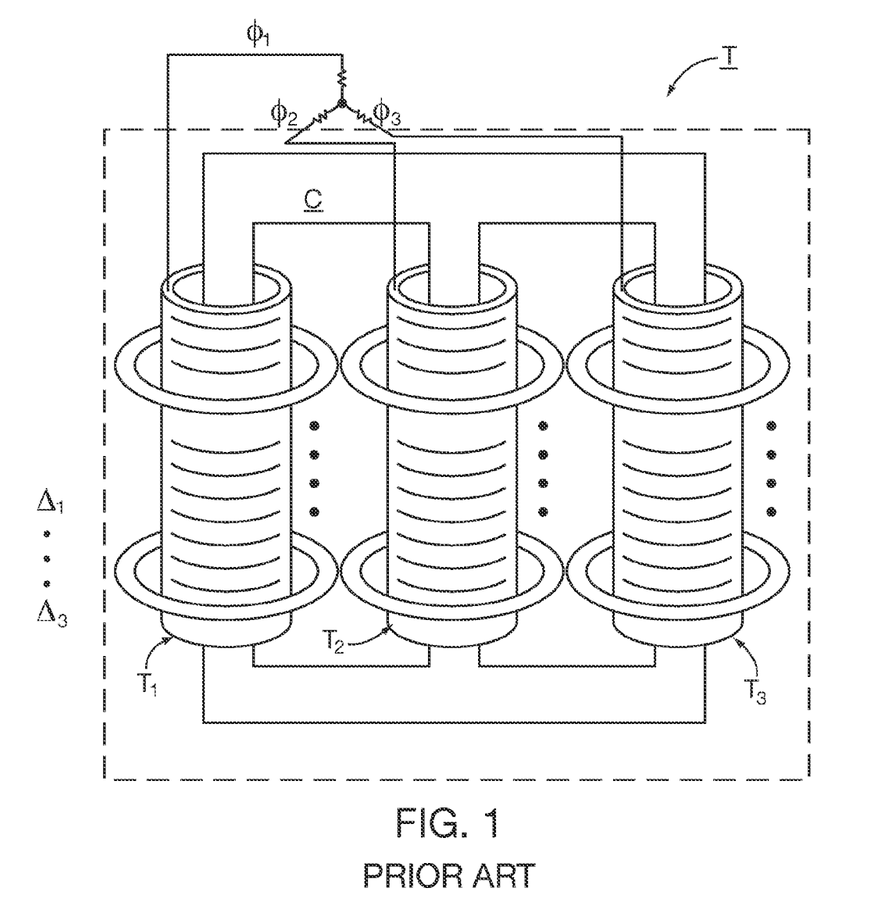
FIG. 1 shows a prior art 3 phase primary winding input to 9 secondary delta winding output transformer coupled to a 3 phase power source in order to provide for 9 separate secondary outputs.
Figure 2:
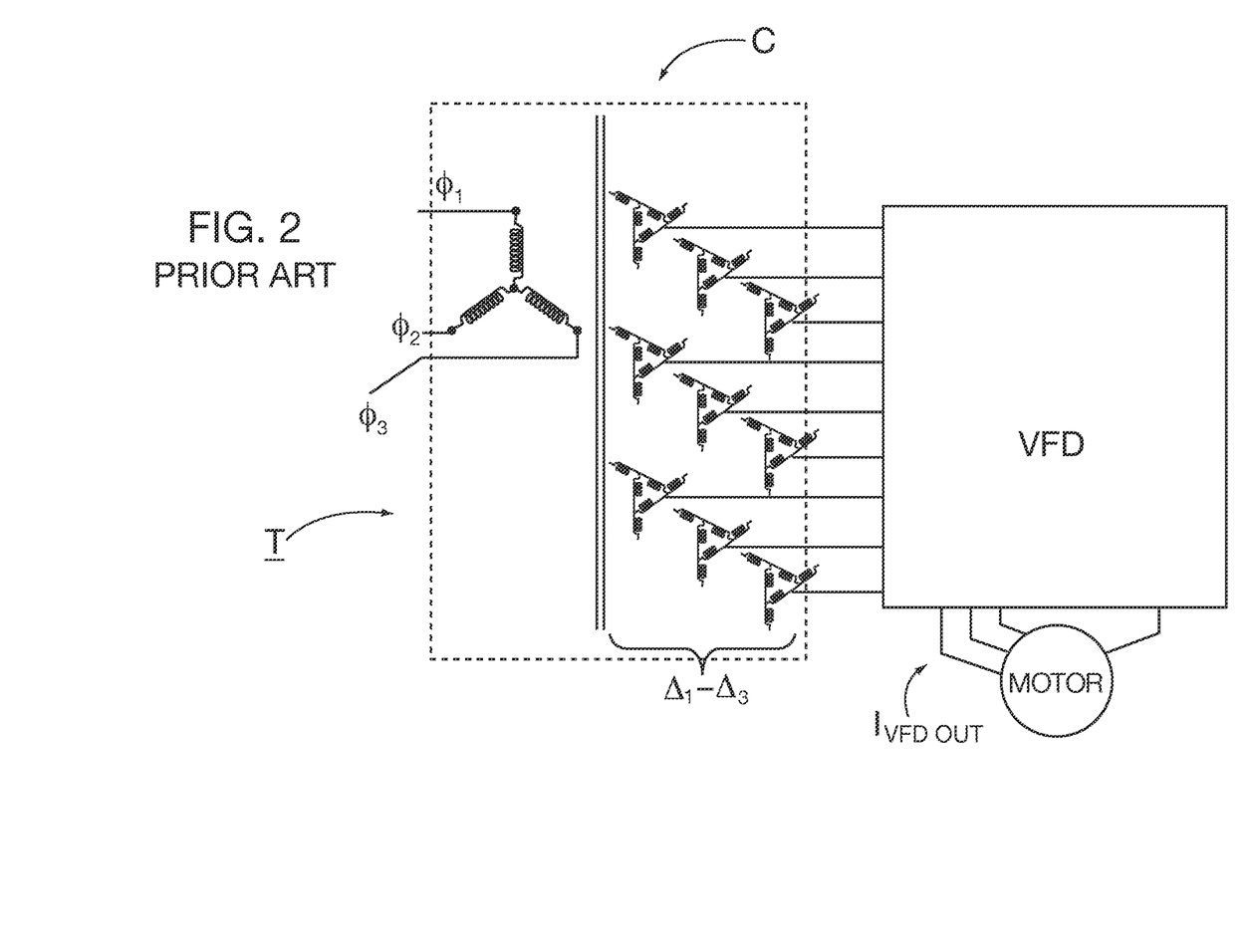
FIG. 2 is a prior art schematic block diagram of the prior art transformer of FIG. 1 powering a variable frequency drive (VFD) and AC motor.

Some known AC variable frequency drives require 9 input current power phases in order to provide drive control to a three phase AC motor. As is shown in FIGS. 1 and 2, each of three power input phases is split to three separate secondaries by known 3-9 phase transformer T. In transformer T, three known paired primary/secondary winding bundles $T_1$, $T_2$, $T_3$ respectively have a primary winding coupled to one of the input power phases over which are wound separate torroidal secondary windings in a so-called delta configuration. In each bundle the primary winding is wound about a separate rung of a commonly shared planar ladder-shaped ferromagnetic laminated core C, and in turn the secondary windings of the bundle are wrapped around the primary winding. Each separate primary/secondary winding bundle $T_{1-3}$ respectively converts a single phase $\Phi_1$, $\Phi_2$, $\Phi_3$ of three phase AC input power into nine secondaries of output power, collectively $\Phi_A$-$\Phi_I$. The collective transformer output power $\Phi_A$-$\Phi_I$ are fed to known variable frequency drive VFD, the output power of which controls operational drive parameters of MOTOR.

Thus in known VFD systems ladder core multi-phase transformers require relatively complex internal winding structures in their primary/secondary cores and occupy a relatively large installation footprint.

Known ladder-type core multi-phase transformers generally require ferromagnetic cores specifically configured for a particular phase conversion application. For example, a single phase input, transformer core (often 1 or 2 ladder rung core) has a different structure than one for two phase input (at least 2 ladder rung core) or one for a three phase input (at least 3 ladder rung core). Similarly, multiple configurations of primary/secondary winding bundles are needed depending upon the number of output phases. Bundle manufacture is further complicated because they are not pre-assembled. The bundle primary winding must be wrapped around the ferromagnetic core before the secondary windings can be wrapped around the primary winding. Thus known ladder core transformers require complex core winding configurations and winding procedures that consume large quantities of conductive winding wire.

Thus, a need exists in the art for a modular transformer core structure that can be utilized for multiple types of transformer applications, from single phase input-to-single phase output, single phase input-to-multi-phase output and poly-phase input-to-polyphase output.

Another need exists in the art for a modular transformer winding structure that can be utilized for multiple types of transformer applications, from single phase input-to-single phase output, single phase input-to-multi-phase output and poly-phase input-to-polyphase output.

Yet another need exists in the art for a reconfigurable modular poly-phase transformer that can replace known transformers that are configured for dedicated applications of single input phase-to-multi-output or polyphase input-to-polyphase output, including those commonly using three-phase utility grid line bower for in turn powering polyphase variable frequency drives.

An additional need exists in the art for transformer winding configurations that reduce quantities of conductive winding wire needed for their construction and/or simplify transformer manufacture.

SUMMARY OF THE INVENTION

Accordingly, an object of the present invention is to create a transformer including a modular core structure capable of being configured for single or poly phase inputs and/or output.

Another object of the present invention is to create a modular transformer winding structure that can be utilized for multiple types of single and polyphase transformer input and output applications.

Yet an another object of the present invention is to reduce the number of different types of transformer apparatus needed to convert single or polyphase power input to polyphase power output, by creating a reconfigurable modular polyphase transformer.

An additional object of the present invention is to simplify methods for winding conductive wire about transformer cores, so as to create a transformer that consumes less conductive wire during construction and/or is simpler to manufacture.

These and other objects are achieved in accordance with the present invention by a transformer having a modular, reconfigurable cylindrical nested core and winding configuration suitable for single or polyphase or input and/or output transformer applications. A transformer constructed in accordance with the teachings of the present invention in polyphase input applications can replace many different separate dedicated single application single or polyphase input and/or output transformers, thereby reducing the number of transformer units needed in manufacture and distribution chain inventory. The modular transformer core and winding structure of the present invention is capable of being configured to provide for single or polyphase inputs or outputs. In other preferred embodiments of the present invention, methods for simplifying winding patterns of transformer cores are disclosed that also minimize quantity of core winding wire necessary for manufacture of a transformer apparatus.

The present invention features a transformer, including a housing. The housing encloses therein a stationary primary core, having a cylindrical outer circumference defining a plurality of axially oriented primary slots. The housing also encloses an annular shaped stationary secondary core, having a cylindrical inner circumference defining a plurality of axially oriented secondary slots, concentrically oriented about the primary core inner circumference. At least one-phase primary winding is oriented within the primary slots, that is coupled to a phase of alternating current input, power. At least one-phase secondary winding is oriented within the secondary slots, inductively coupled to the at least one-phase primary winding, for generating a separate phase of alternating current output power. A primary or secondary winding may further comprise sub-windings, each respectively for a separate phase.

Another embodiment of the present invention features a polyphase transformer having a housing. The housing encloses a stationary primary core, having a cylindrical outer circumference defining 18 axially oriented primary slots. The transformer also has an annular shaped stationary secondary core, having a cylindrical inner circumference defining 27 axially oriented secondary slots, concentrically oriented about the primary core outer circumference. A three phase primary winding is oriented within the primary slots, the winding having a plurality of sub-windings respectively coupled to a phase of alternating current input power. The primary winding defines a symmetrical continuous coil pattern of sub-windings about the primary core through two adjacent primary slots and then skips a plurality of slots before repeating that respective coil pattern. A nine-phase secondary winding having nine sub-windings is oriented within the secondary slots, inductively coupled to the primary winding, for generating nine separate phases of alternating current output power. The nine-phase secondary winding defines a symmetrical continuous coil pattern of sub-windings about the secondary core through two adjacent primary slots and then skipping a plurality of slots before repeating the respective coil pattern.

Another embodiment of the present invention features a method for fabricating a polyphase transformer. The method comprises providing a primary core, having a cylindrical outer circumference defining a plurality of axially oriented primary slots. At least one primary winding is wound in a symmetrical continuous winding pattern about the primary core through two adjacent primary slots and then skipping a plurality of slots before repeating that winding pattern. An annular shaped secondary core is provided, having a cylindrical, inner circumference defining a plurality of axially oriented secondary slots. At least one secondary winding is wound in a symmetrical continuous winding pattern about the secondary core through two adjacent primary slots and then skipping a plurality of slots before repeating that winding pattern. The secondary core cylindrical, inner circumference is aligned and rigidly affixed about the primary core outer circumference, so that both cores remain stationary relative to each other. The primary and secondary cores are enclosed in a housing.

The objects and features of the present invention may be applied jointly or severally in any combination or sub-combination, by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in modular AC transformers having a modular nested cylindrical core structure that facilitates configuration for single or polyphase input and/or output. Different configurations of the modular primary and secondary transformer cores may be pre-wound with different winding configurations for different input and output phase configuration requirements. For example, primary cores can be pre-wound for single, two or three phase inputs applications. Similarly, secondary cores can be pre-wound for single, two or three phase output applications. Various combinations of pre fabricated primary and secondary cores can be subsequently assembled to meet the configuration specifications of a desired application.

The teachings of the present invention also include methods for winding modular transformer cores of the present invention that simplify core winding and reduce core conductive wire consumption during transformer manufacture.

Transformer General Construction

Figure 3:
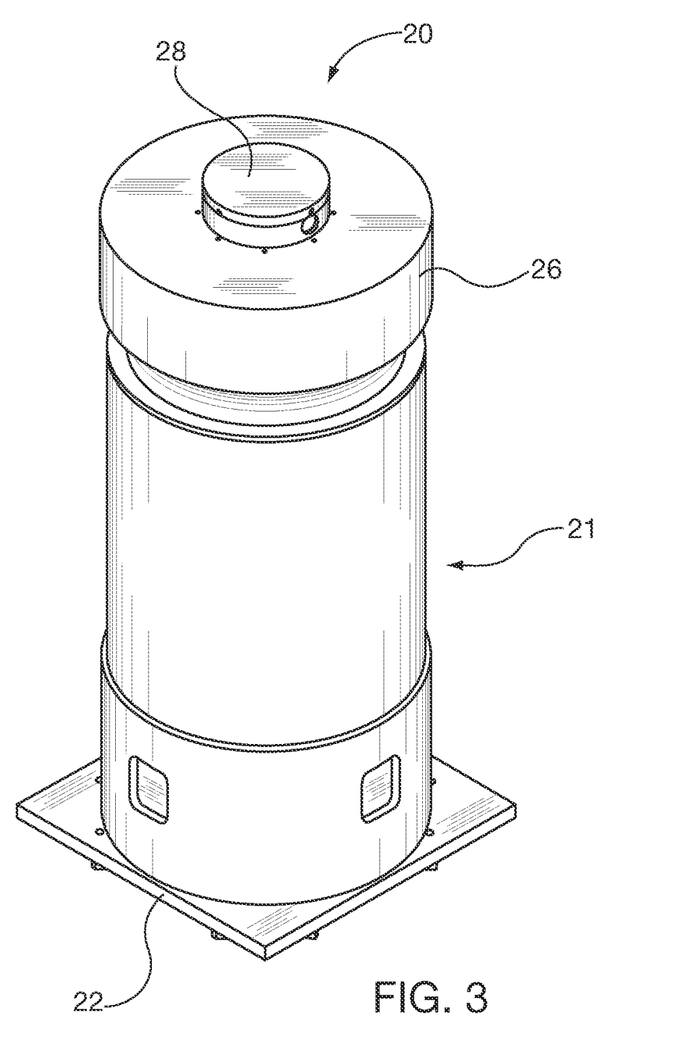
FIG. 3 is a perspective view of an embodiment of a modular construction transformer of the present invention.
Figure 4:
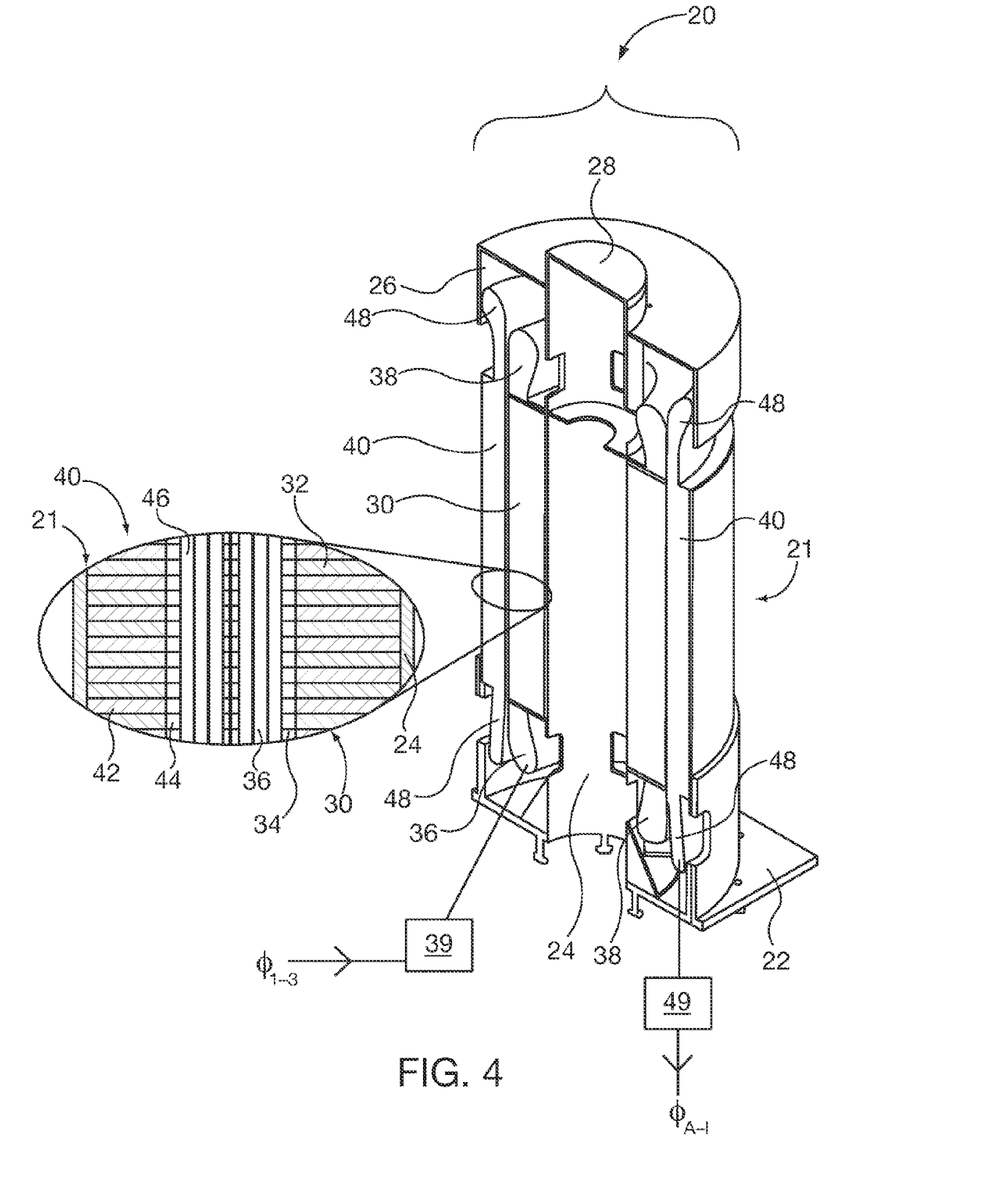
FIG. 4 is a cutaway perspective view of the transformer of FIG. 3.

Turning now to examples of modular transformers constructed in accordance with the teachings of the present invention, FIGS. 3 and 4 show generally a transformer 20 having a cylindrical housing 21, the bottom end of which is affixed to a bucket plate 22. Center pipe support 24 is of generally cylindrical construction, the bottom end of which is affixed to bucket plate 22 so that it is generally concentric with housing 21. The top end of housing 21 is capped with top air deflector 26 and baffle assembly 28 os mated into the upper end of center pipe support 24. Cooling air circulates through the center bore of center pipe support 24 in chimney-like fashion. If desired an auxiliary circulation device, such as an electric fan may be positioned in communication with the center pipe support 24 center bore, in order to increase cooling air circulation.

A generally annular primary core 30, constructed of a stack of ferromagnetic lamina sheets 32 has primary slots 34 through which are wound a primary core winding 36. The winding wire used to fabricate winding 36 is insulated wire of known construction and an appropriate number of coil turns necessary to create a desired electromagnetic field strength within the transformer. Winding coils wrapped within slots terminate in end windings 38 that are coupled to a corresponding input power phase via an input terminal block 39 of known construction. Primary core 30 is similar in general construction to that of known AC induction motor rotors, with the center support pipe 24 taking the place of a motor shaft.

A generally annular secondary core 40 constructed of a stack of ferromagnetic lamina sheets 42 has primary slots 44 through which are wound a primary core winding 46. As with the primary core winding 36, the winding wire used to fabricate secondary winding 46 is insulated wire of known construction and an appropriate number of coil turns necessary to create a desired electromagnetic field strength within the transformer. Winding coils wrapped within slots terminate in end windings 48 that are coupled to a corresponding input power phase via an input terminal block 49 of known construction. Primary core 40 is similar in general construction to that of known AC induction motor stators, with the transformer housing 21 taking the place of a motor frame housing. As in known induction motor rotors and stators, the primary and secondary cores 30, 40 of transformer 20 may include cooling vent passages, not shown. An added possible advantage of utilizing a transformer core structure similar to that of known AC induction motors is that the core windings may be fabricated and installed in the cores with methods and machinery commonly used in motor manufacture.

Transformer Modular Assembly

An exemplary assembly procedure for transformer 20 is by nesting an assembled, pre-wound primary core 30 within the annular bore of the assembled, pre-wound secondary core 40 and rigidly affixing both to bucket plate 22, so as to maintain relative orientation of both cores when the transformer is energized. Unlike in an AC induction motor or a generator, where relative rotation of both cores is needed for proper operation of the electrodynamic machine it is desired to maintain fixed, relative position of core portions in a transformer. The housing 21 and center pipe support 24 are affixed to the bucket plate 22 and, if desired, to the respective core 30 or 40 in which either the housing or center pipe support is in adjacent contact. Primary core end windings 38 are coupled to primary terminal block 39. Similarly secondary core end windings are coupled to secondary terminal block 49. The top air deflector 26 and baffle assembly 28 are affixed in their assembly positions on top of the transformer 20. One skilled in the art may alter this exemplary assembly sequence, add or delete assembly steps to meet the needs of a particular transformer or manufacturing facility configuration.

A possible advantage of the present invention is that primary and secondary cores 30, 40 may be pre-fabricated in various transformer winding configurations needed for single or poly phase inputs or outputs and the modular cores assembled in any desired combination to meet a needed transformer specification. For example, a modular single phase primary core 30 may be assembled with a single, two or three phase secondary core 40. Alternatively, a two or three phase (polyphase) primary core may be assembled with a secondary core configured to provide for single or polyphase output (i.e., 1, 2 or 3 phase output per input phase).

Figure 5:
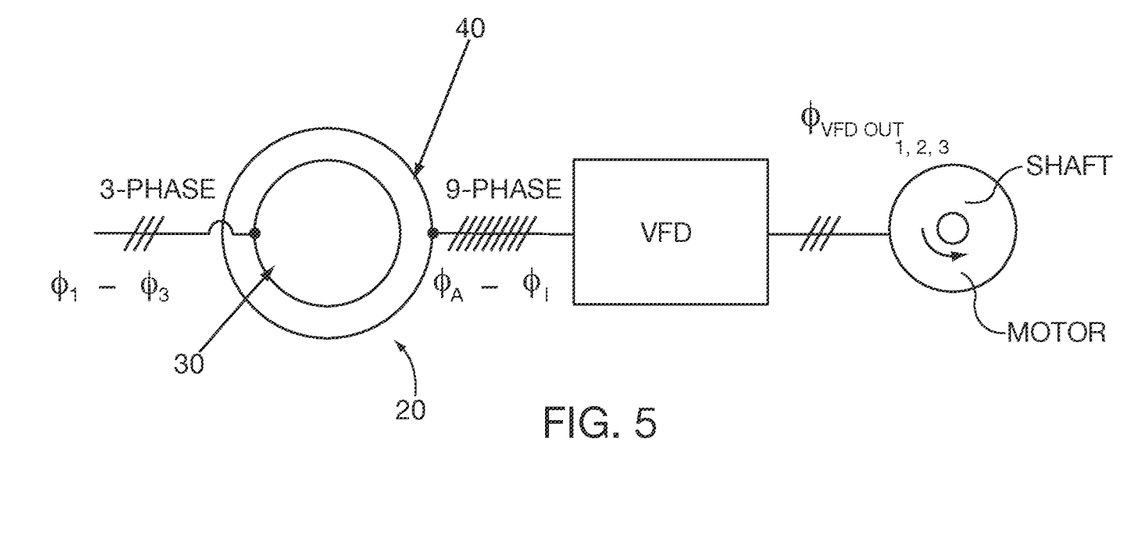
FIG. 5 is a schematic block diagram of the transformer of FIGS. 3 and 4 in an exemplary application for powering a variable frequency drive and AC motor, in which multiple phases are signified by hash marks in a single power line.

Returning to the example of an AC Motor controlled by a VFD, FIG. 5 shows a polyphase modular transformer 20 of the present invention having 3 phase power input and 9 phase power output coupled to a known VFD. In the figure, multiple phases are signified by hash marks in a single power line. The VFD has 3 phase output coupled to and controlling an AC induction motor.

Exemplary Core Slot and Winding Configurations

Figure 6:
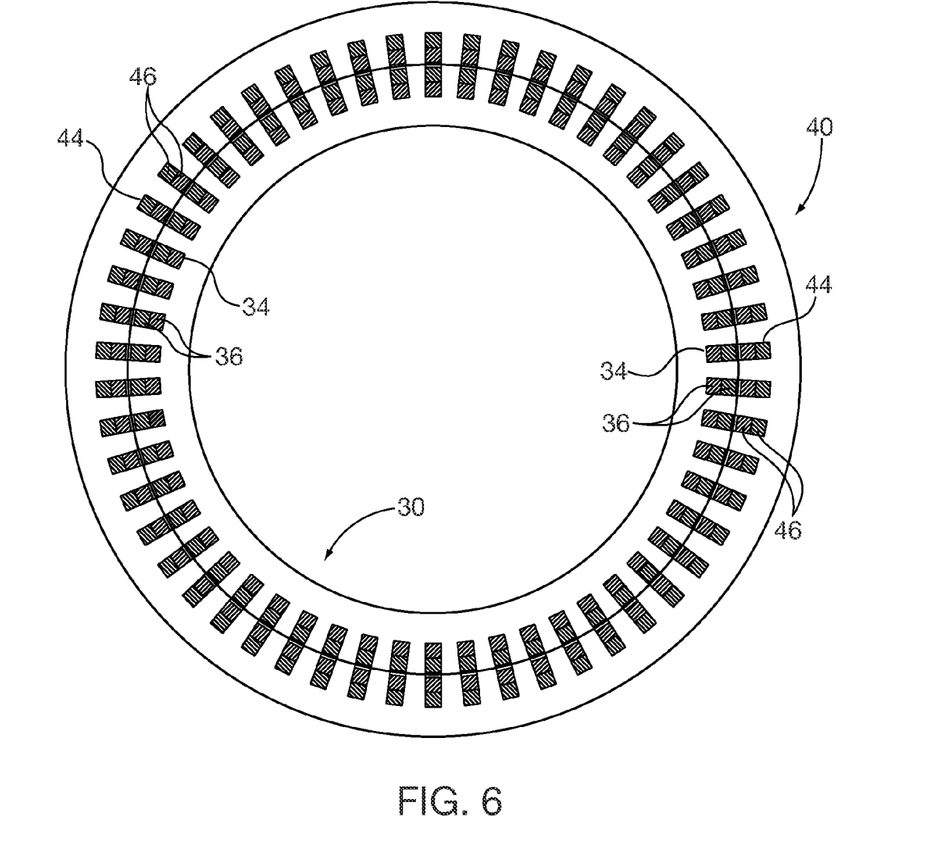
FIG. 6 is a plan drawing of an embodiment of the modular primary and secondary transformer cores of the present invention.

FIG. 6 shows a transformer modular core structure of the present invention wherein both the primary core 30 and secondary core 40 respectively have 54 equal angularly arrayed, radially aligned winding slots 34, 44. Such a 54 slot construction is a known geometry for some AC induction motor designs.

Figure 7:
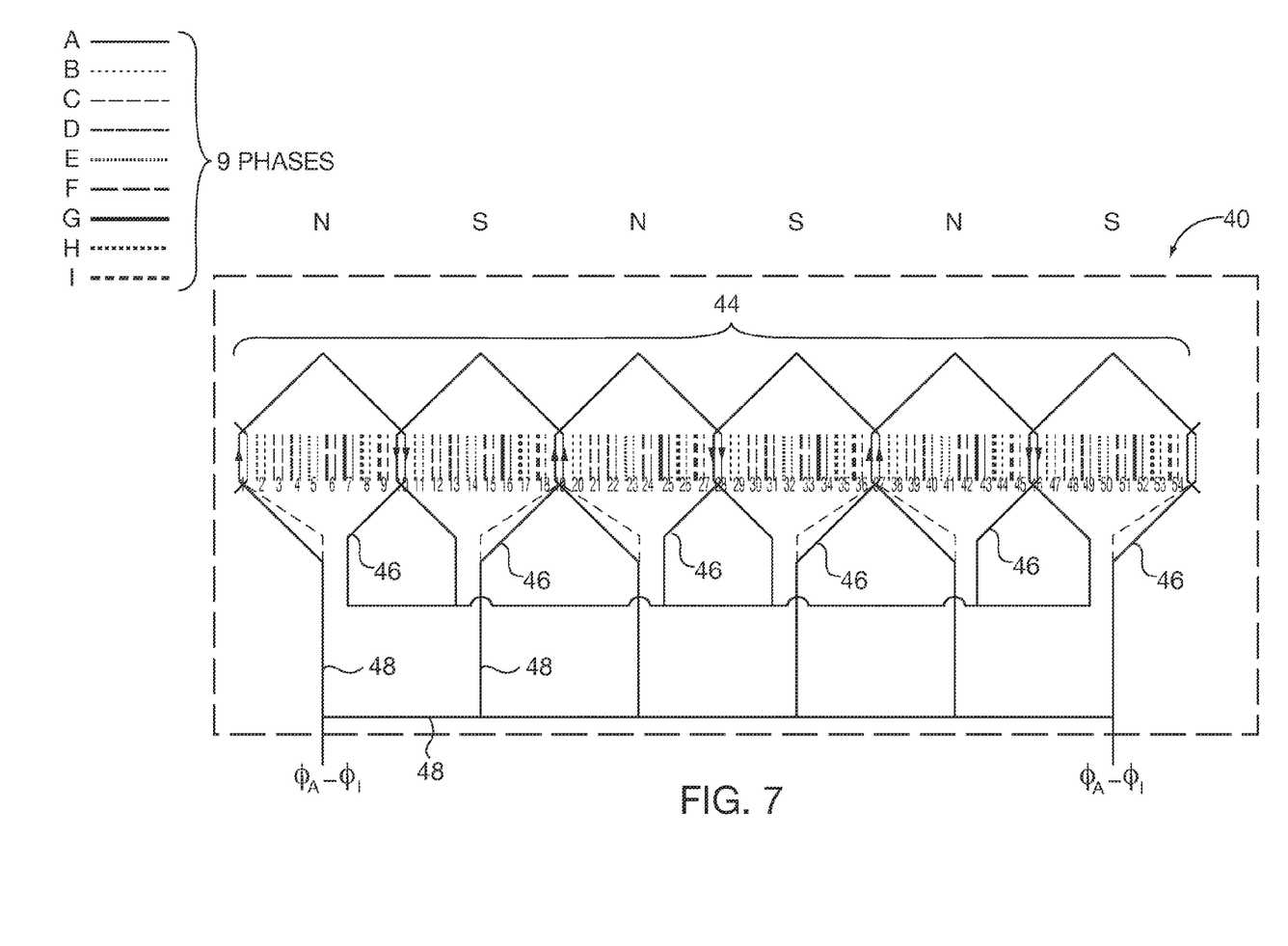
FIG. 7 is a secondary winding diagram for one embodiment of the present invention in a 9 phase distributed winding configuration of the transformer core of FIG. 6.

Referring to FIG. 7, the secondary core 40 of FIG. 6 has secondary slots 44, labeled 1-54, and is wound for a 9 phase output transformer. A winding loop bundle comprising a plurality of wire strands is formed. Inc secondary core 40 has a distributed winding pattern of the type commonly used in AC motor fabrication. A "distributed" winding pattern is characterized by multiple closed-loop sub-winding coils 46 that pass through a slot (in FIG. 7 starting in labeled slot #1, skip 8 slots and then pass the loop back through labeled slot #10. Each loop sub-winding 46 is closed to form an end loop 48 having a tail portion. The sequential pattern repeats, with one loop portion 46 sharing the same slot as the return portion of the prior loop (here the second loop starts in labeled slot 19 and returns through labeled slot #10, etc.), for a total of 6 closed loops 46. All 6 sub-winding winding closed loops 46 are joined in parallel and form end loop 48. The ends of each end loop 48 are coupled to the output terminal block 49 (not shown). Each end loop 48 is constructed from the same winding bundle as the winding loop 46, necessitating a large quantity of wire in the end-windings, and also occupying a relatively large volume of space on the ends of the core 40. The next secondary phase sub-winding starts in labeled slot #2, repeating the same pattern as the prior secondary phase sub-winding. The third secondary phase sub-winding starts in labeled slot #3, etc., until all 9 of the separate respective sub-windings that together form the 9-phase secondary winding are fabricated.

In the transformer core construction of FIG. 6, the primary core 30 has a three phase distributed winding pattern of three sub-windings well known in the AC induction motor arts, wherein a winding loop bundle comprising a plurality of wire strands is formed create loops 36 that are joined in parallel via end loops 38, that in turn are coupled to primary terminal block 39. For brevity, the well-known three phase distributed winding pattern is not shown in the figures. While distributed winding patterns are well known in the AC induction motor arts they consume large quantities of wire in the end-windings. The present invention includes an additional available method for making simplified, "compact" transformer core windings that reduce the quantity of wire needed to form end windings. The compact winding pattern described herein has been used in stator windings of permanent magnet AC motors, but heretofore it is not believed that the pattern has been applied in the past to polyphase transformers of the type of the present invention.

Figure 8:
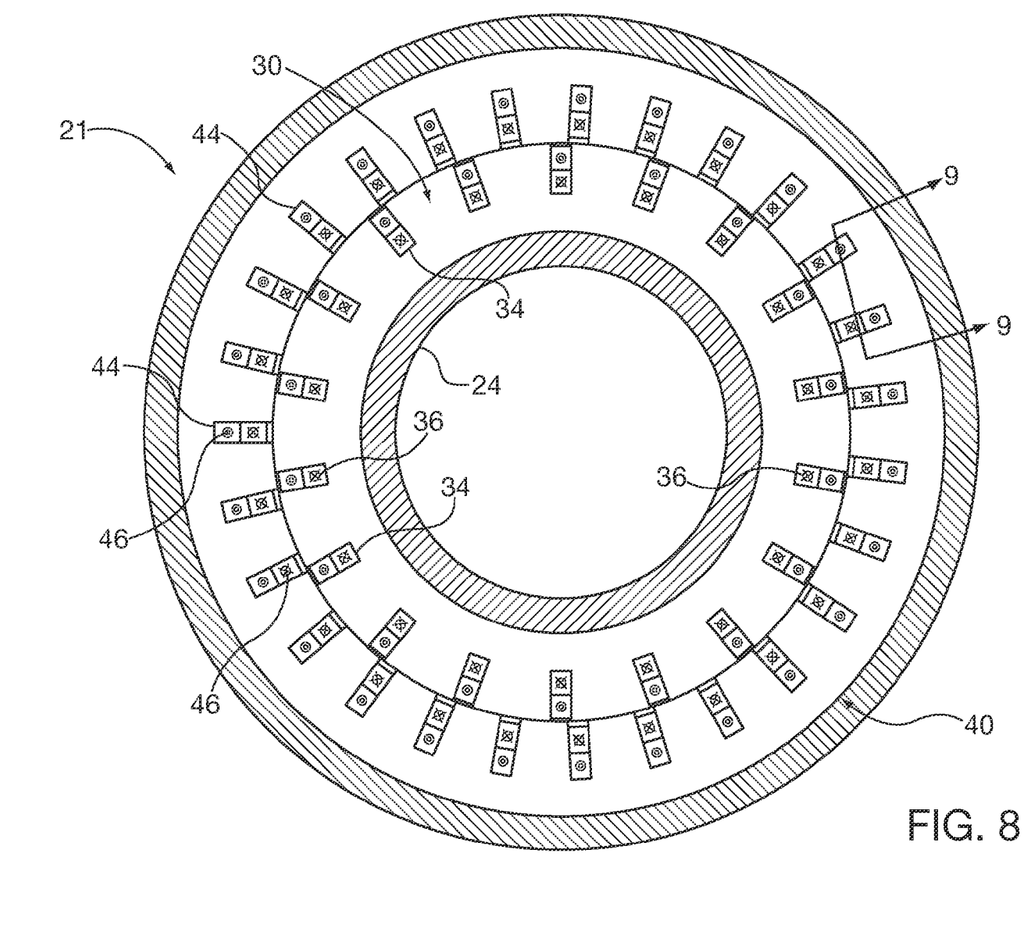
FIG. 8 is a plan drawing of an alternative embodiment of primary and secondary transformer cores and their respective windings of the present invention.
Figure 9:
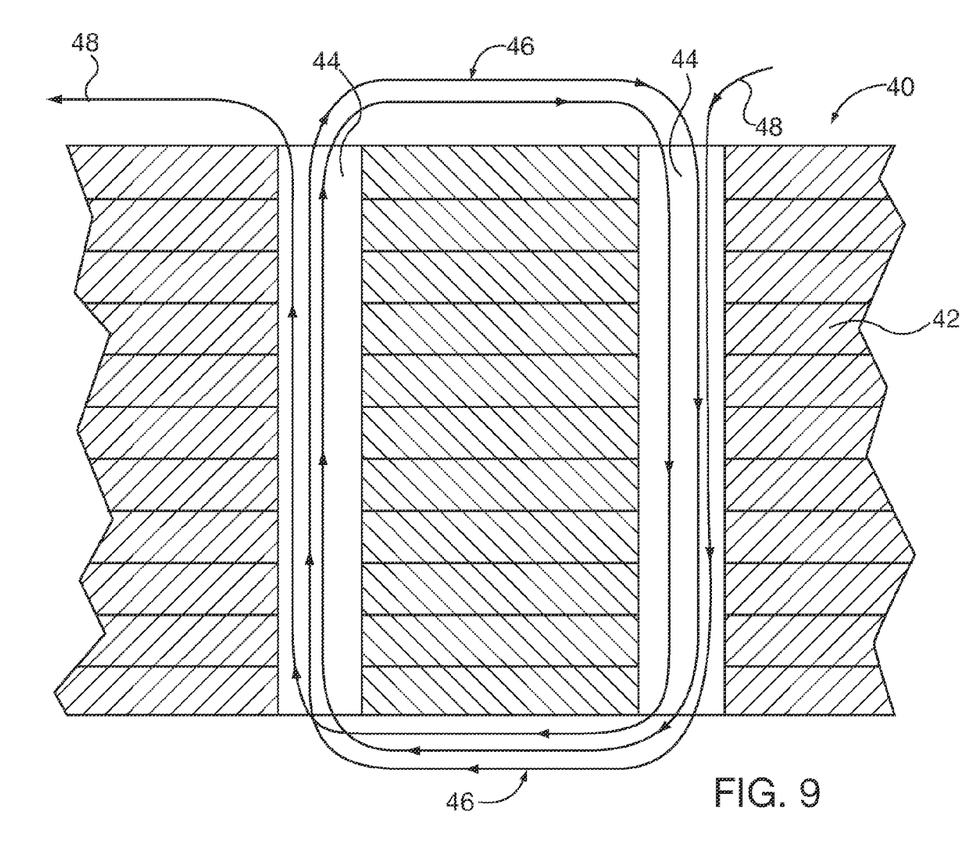
FIG. 9 is an elevational section taken along 9-9 of FIG. 8.

The compact winding method and resultant core assemblies resulting from use of that method are shown in FIGS. 8-12. The transformer core preferably used for the compact winding pattern is shown in FIGS. 8 and 9. It is noted that winding coil turns going down through the plane of FIG. 8 are signified by an X in a circle and winding coil turns coming up through the plane of the figure are signified by a dot in a circle. As shown in FIGS. 8 and 9, coils of sub-windings that in aggregate form secondary winding 46 are passed through 27 secondary core slots 44. Each loop coil of a sub-winding forming secondary winding 46 is formed by wrapping a single wire strand multiple turns around two adjacent slots 44 to form a plural strand conductive loop coil. Only a single strand of wire forms end windings 48, thereby saving a considerable quantity of wire compared to distributed winding patterns that incorporate the entire thickness of the winding bundle. Also as noted in the secondary core winding diagram of FIG. 11 the individual coil loops of a sub-winding forming secondary winding 46 are serially coupled by wrapping a loop about two adjoining secondary slots 44, skipping one slot, then repeating the winding pattern about the next two adjoining slots 44. As is also apparent in the continuous compact winding pattern of FIG. 11, two output phases share secondary core slots. 44. As a result 9 output phases can be wrapped within only 27 slots.

Figure 10:
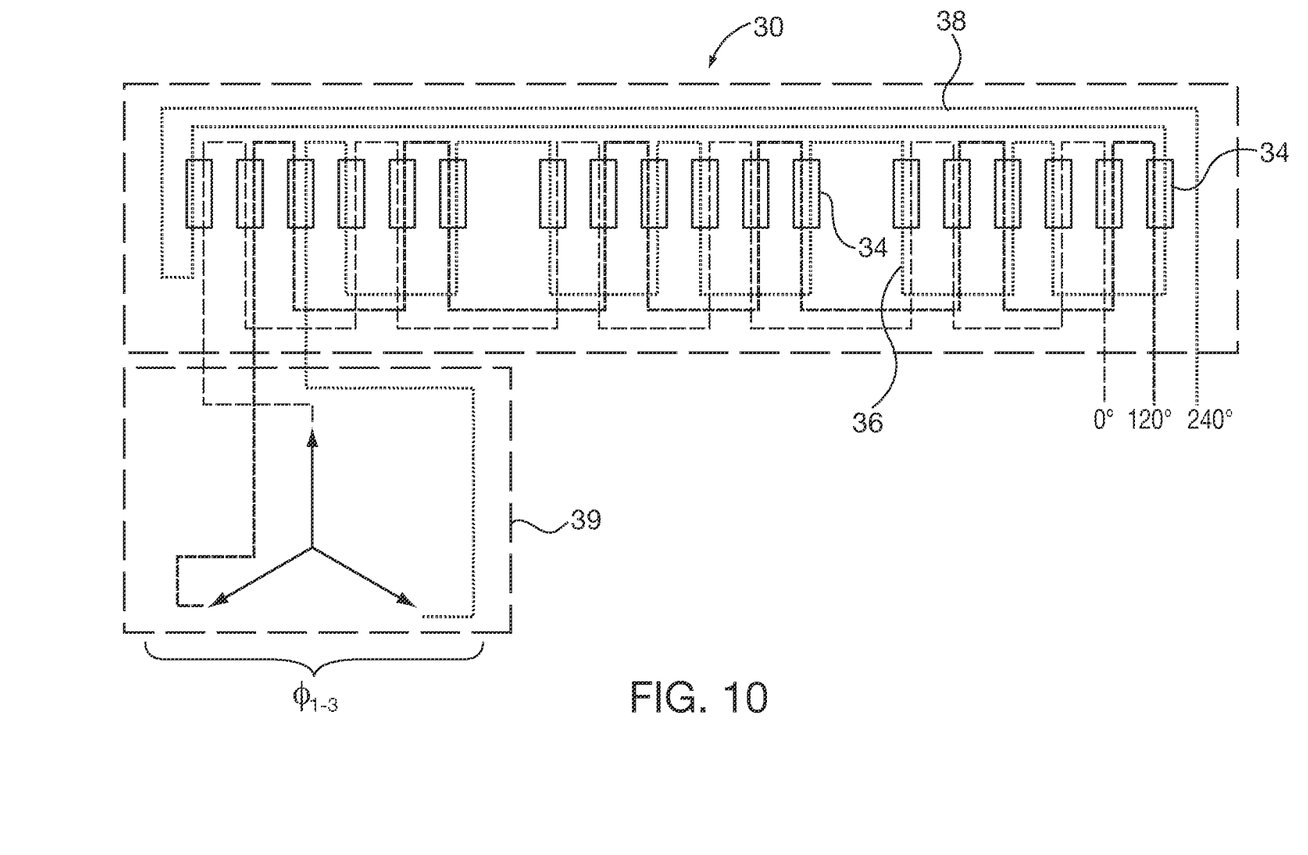
FIG. 10 is a primary winding diagram for a winding embodiment of the present invention in a 3 phase continuous winding configuration of the primary transformer core of FIGS. 8 and 9.
Figure 11:
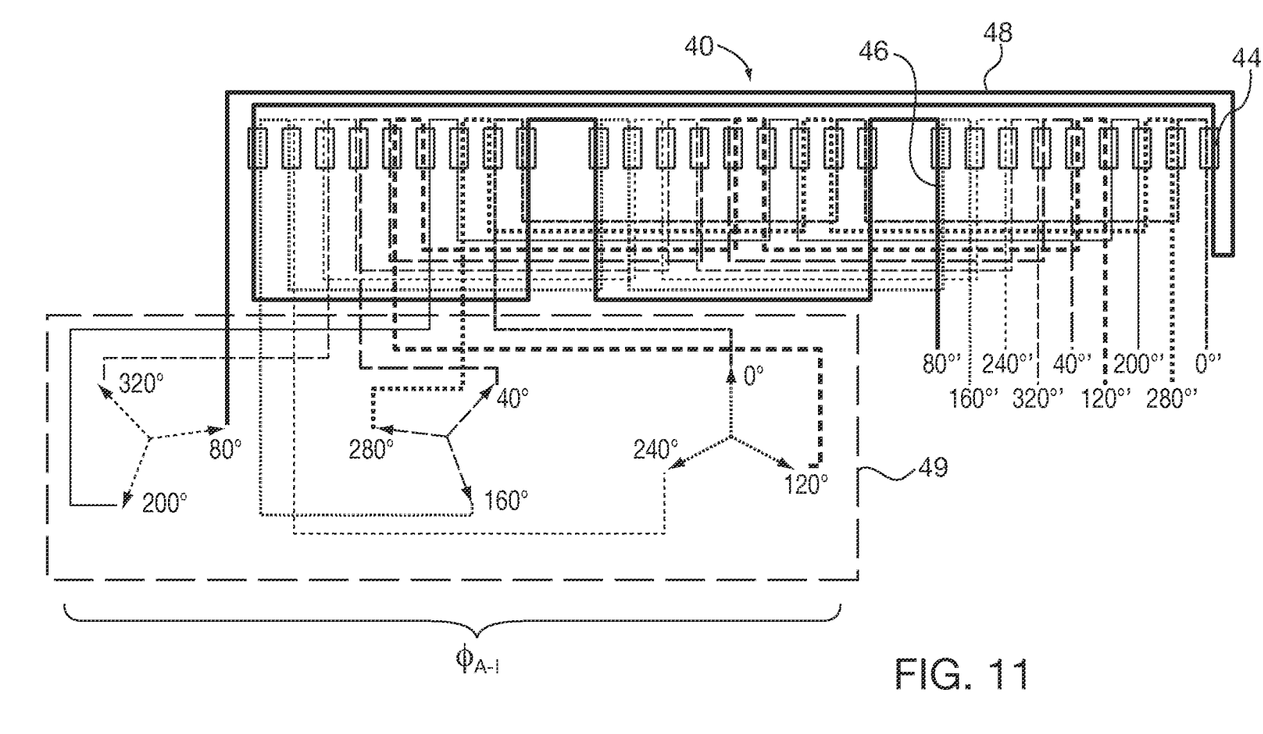
FIG. 11 is a secondary winding diagram for a winding embodiment of the present invention, in a 9 phase continuous winding configuration of the secondary transformer core of FIGS. 8 and 9.
Figure 12:
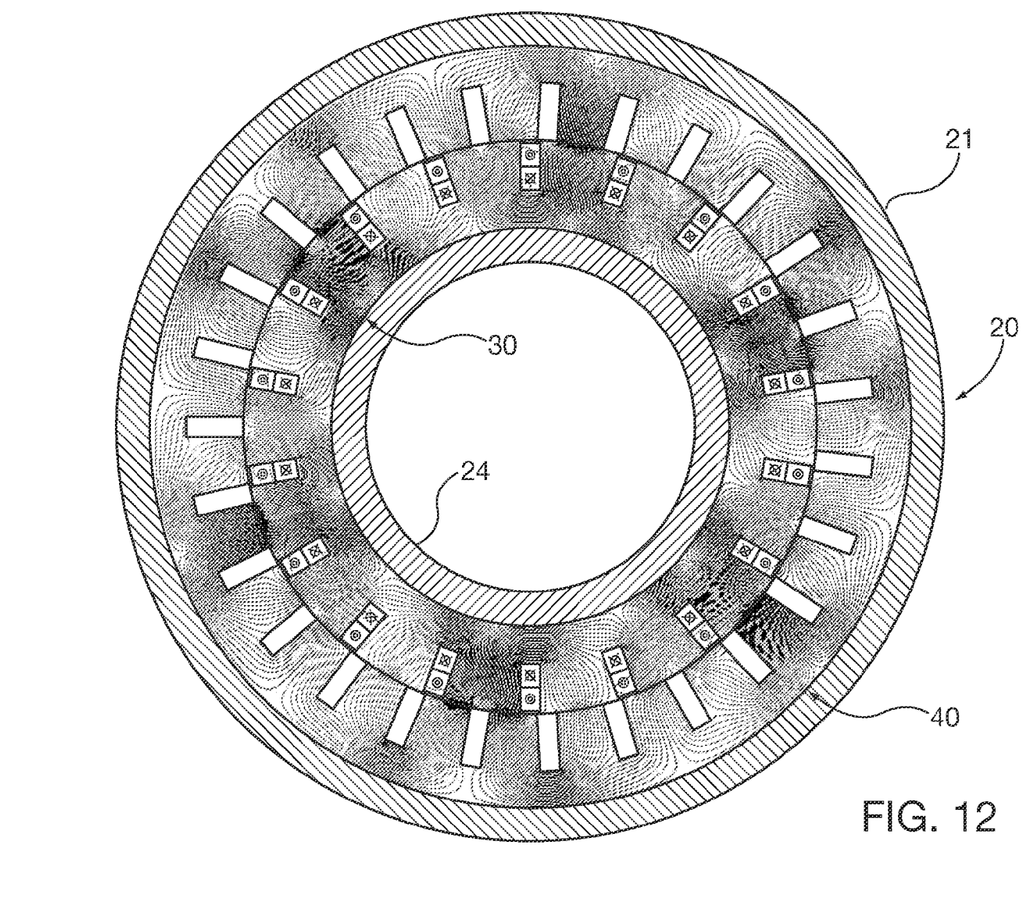
FIG. 12 is a simulation of flux lines distribution of the transformer core of FIGS. 8 and 9.

In the embodiment of FIGS. 8-12 the primary core 30 has a total of 18 primary slots 36 in which are passed coil loops of the sub-windings forming primary winding 36. The winding pattern for the primary winding 36 and respective single-strand end windings 38 are shown in FIG. 10. The winding method of multiple strands around two adjoining primary slots 34 and single strand end loop 38, terminating in terminal block 39, is the same as that used for the previously described secondary winding 46. A simulation of the winding flux of a transformer core constructed in accordance with FIGS. 8-11 is shown in FIG. 12.

In summary, the teachings of the present invention enable those skilled in the art to construct single or polyphase AC power transformers with modular, pre-fabricated primary and secondary core windings that may be configured for different, input and output phase specifications and applications. The number of transformer primary and secondary core components can be reduced compared to specialized cores designed for only limited applications. Core winding techniques taught herein can simplify winding fabrication and reduce quantity of wire needed to construct the cores. The modular transformers of the present invention can share the same relatively compact installation footprint whether configured for single phase or polyphase applications.

Although various embodiments which incorporate the teachings of the present invention have been shown and described in detail herein, those skilled in the art can readily devise many other varied embodiments that still incorporate these teachings.

What is claimed is:

1. A transformer, comprising:
 a housing enclosing therein:
  a first module including a stationary primary core, wherein the primary core includes a cylindrical outer circumference defining a plurality of axially oriented primary slots;
  a second module including an annular shaped stationary secondary core, wherein the secondary core includes a cylindrical inner circumference defining a plurality of axially oriented secondary slots, and wherein the first module is assembled into the second module such that said inner circumference is concentrically oriented about the primary core outer circumference;
  at least one phase primary winding oriented within the primary slots, for coupling to a phase of alternating current input power;
  at least one phase secondary winding oriented within the secondary slots, inductively coupled to the at least one phase primary winding, for generating a separate phase of alternating current output power wherein the primary and secondary windings are prefabricated before the first module is assembled into the second module.

2. The transformer of claim 1, further comprising a plurality of separate sub-windings within the primary winding oriented within the primary slots, each for coupling to a separate phase of alternating current input power.

3. The transformer of claim 2, further comprising:
 a first plurality of separate sub-windings within the secondary winding oriented within the secondary slots, each of said sub-windings inductively coupled to one of the plurality of phase primary sub-windings;
 a second plurality of separate sub-windings within the secondary winding oriented within the secondary slots, each of said sub-windings inductively coupled to another of the plurality of phase primary sub-windings; and
 each of said secondary sub-windings for generating a separate phase of alternating current output power.

4. The transformer of claim 1, further comprising a plurality of separate sub-windings within the secondary winding oriented within the secondary slots, each of said sub-windings inductively coupled to the at least one phase primary winding, each of said secondary sub-windings for generating a separate phase of alternating current output power.

5. The transformer of claim 1, wherein at least one of the windings defines a symmetrical distributed winding pattern having a plurality of separate closed-loop sub-windings arranged in a sequential pattern wherein a loop of a subsequent sub-winding shares a slot with a return portion of a loop of a prior sub-winding wherein said sub-windings are coupled in parallel, each sub-winding skipping an equal number of slots.

6. The transformer of claim 5, wherein the winding pattern on a core respectively defines a symmetrical distributed winding pattern having a plurality of separate closed-loop sub-windings arranged in a sequential pattern wherein a loop of a subsequent sub-winding shares a slot with a return portion of a loop of a prior sub-winding wherein said sub-windings are coupled in parallel, each sub-winding skipping an equal number of slots.

7. The transformer of claim 6, further comprising three primary phases and nine secondary phases.

8. The transformer of claim 1, wherein each respective core defines an equal number of respective slots.

9. The transformer of claim 1, wherein the primary and secondary slots are radially offset relative to each other.

10. The transformer of claim 1, wherein the primary core defines fewer slots than the secondary core.

11. The transformer of claim 1, further comprising three primary phases and nine secondary phases.

12. The transformer of claim 1, wherein at least one of the windings defines a symmetrical continuous winding pattern about its respective core wherein at least one winding includes a sub-winding and wherein each coil loop of said sub-winding is formed by wrapping a single wire strand multiple turns around two adjacent slots and then skips a plurality of slots before repeating said winding pattern.

13. The transformer of claim 12, further comprising three primary phases and nine secondary phases.

14. The transformer of claim 1, incorporated in a variable speed drive system comprising:
 a three phase alternating current power source coupled to the transformer primary core;
 a nine phase alternating current power output coupling the transformer secondary core and a variable frequency drive controller input; and
 a three phase alternating current motor coupled to an output of the controller.

15. A polyphase transformer, comprising:
 a housing enclosing therein:
  a stationary primary core, having a cylindrical outer circumference defining 18 axially oriented primary slots;
  an annular shaped stationary secondary core, having a cylindrical inner circumference defining 27 axially oriented secondary slots, concentrically oriented about the primary core outer circumference;
  a primary winding having three sub-windings oriented within the primary slots, respectively for coupling to a phase of alternating current input power, all three sub-windings respectively defining a symmetrical continuous winding pattern about the primary core through two adjacent primary slots and then skipping a plurality of slots before repeating said respective winding pattern; and a secondary winding having nine sub-windings oriented within the secondary slots, inductively coupled to one of the primary sub-windings, for generating a separate phase of alternating current output power, all nine secondary windings respectively defining a symmetrical continuous winding pattern about the secondary core through two adjacent secondary slots and then skipping a plurality of slots before repeating said respective winding pattern.

\* \* \* \* \*